United States Patent
Fleischman et al.

(10) Patent No.: US 9,575,763 B2
(45) Date of Patent: Feb. 21, 2017

(54) ACCELERATED REVERSAL OF SPECULATIVE STATE CHANGES AND RESOURCE RECOVERY

(71) Applicant: Advanced Micro Devices, Inc., Sunnyvale, CA (US)

(72) Inventors: Jay Fleischman, Fort Collins, CO (US); Michael Estlick, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 668 days.

(21) Appl. No.: 13/918,863

(22) Filed: Jun. 14, 2013

(65) Prior Publication Data

US 2014/0372732 A1 Dec. 18, 2014

(51) Int. Cl.
*G06F 9/32* (2006.01)
*G06F 9/38* (2006.01)

(52) U.S. Cl.
CPC ............ *G06F 9/384* (2013.01); *G06F 9/3842* (2013.01); *G06F 9/3859* (2013.01); *G06F 9/3861* (2013.01)

(58) Field of Classification Search
CPC ........................................................ G06F 9/34
See application file for complete search history.

(56) References Cited

U.S. PATENT DOCUMENTS

| 5,915,110 A * | 6/1999 | Witt ...................... G06F 9/3836 712/239 |
| 6,314,514 B1 * | 11/2001 | McDonald ............ G06F 9/3806 711/132 |

\* cited by examiner

*Primary Examiner* — Cheng-Yuan Tseng

(57) ABSTRACT

A method includes undoing, in reverse program order, changes in a state of a processing device caused by speculative instructions previously dispatched for execution in the processing device and concurrently deallocating resources previously allocated to the speculative instructions in response to interruption of dispatch of instructions due to a flush of the speculative instructions. A processor device comprises a retire queue to store entries for instructions that are awaiting retirement and a finite state machine. The finite state machine is to interrupt dispatch of instructions in response to a flush of speculative instructions previously dispatched for execution in the processing device and to undo, in reverse program order, changes in a state of the processing device caused by the speculative instructions while concurrently deallocating resources previously allocated to the speculative instructions.

20 Claims, 5 Drawing Sheets

ACCELERATED REVERSAL OF SPECULATIVE STATE CHANGES AND RESOURCE RECOVERY

BACKGROUND

Field of the Disclosure

The present disclosure relates generally to processing systems and, more particularly, to the reversal of speculative state changes and resource recovery in processing systems.

Description of the Related Art

Processing devices, such as central processing units (CPUs), graphical processing units (GPUs), and accelerated processing units (APUs), implement instruction pipelines to increase executed instruction throughput. A typical instruction pipeline includes several pipeline stages, such as an instruction fetch stage, a decode stage, an execution stage, a memory access stage, and a write-back stage. Instruction schedulers can be used to improve the overall pipeline throughput by optimizing the order or schedule of execution of instructions. For example, out-of-order instruction scheduling can be used to schedule instructions for execution in the pipeline in an order that is different than the program order of the instructions.

Processing devices may also be able to execute instructions speculatively. For example, the processing device typically includes branch prediction logic that can predict a path following a conditional instruction such as a branch instruction. The processing device can speculatively execute instructions on the path before results of the branch instruction are known. Branch prediction logic can predict the instruction path with reasonable accuracy and consequently speculative instruction execution can improve the performance of the processing device. However, branch prediction logic is not perfect and the processing device should be able to recover when the branch prediction logic picks the wrong path and instructions that were executed speculatively along incorrectly predicted paths are flushed from the pipeline. Recovery typically includes waiting for any speculative instructions along correctly predicted paths to retire. Once the correct speculative instructions have retired, state changes caused by the incorrect speculative instructions can be reversed. Resources such as register file entries that were allocated to instructions along the incorrectly predicted path may then be recovered.

DETAILED DESCRIPTION

Figure 1:
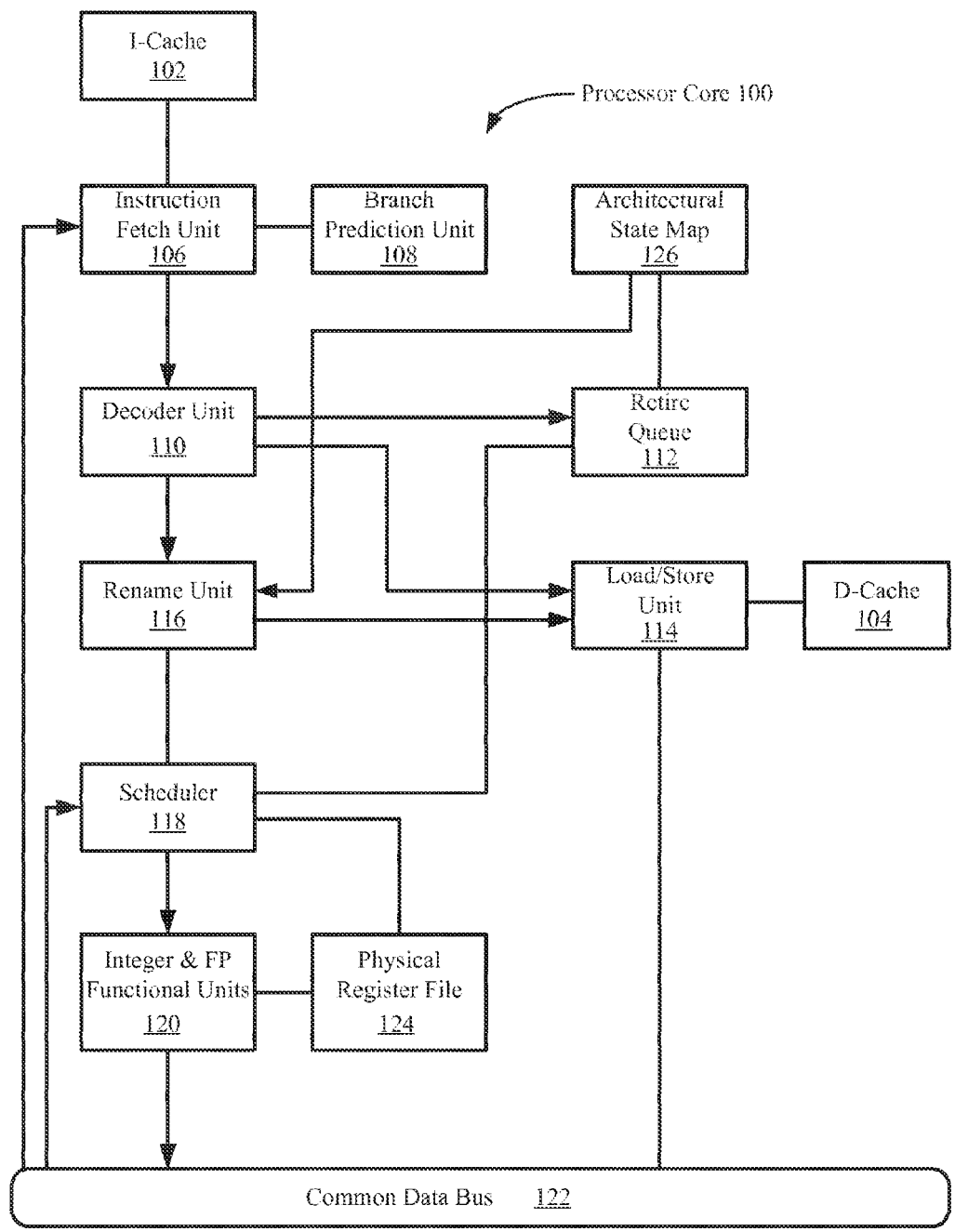
FIG. 1 is a block diagram of a processor core, according to some embodiments.

As discussed herein, a processing device typically needs to return to a previous state when speculative instructions are flushed from an instruction pipeline. Different approaches have been adopted to recover from a flush and return the committed state and the speculative state of the processing device to the state prior to the flushed speculative instructions. In conventional systems, the processing device may recover by stopping the dispatch of new instructions, waiting for retirement of instructions along correct speculative paths, and then copying the committed state to the speculative state. New instructions are allowed to dispatch once the committed state has been copied to the speculative state. Implementations of this approach may not require extra storage, but may reduce performance because dispatch has to wait for retire to catch up before resuming. For example, a copy of the speculative state after dispatch of instructions along a correctly-predicted path can be stored as a checkpointed state. The checkpointed state can then be copied back to the speculative state on a subsequent flush of instructions along an incorrectly predicted path. Checkpointing can improve performance because dispatch can resume as soon as the checkpointed state has been copied back to the speculative state, but this performance improvement comes at the cost of the area used to implement storage for the checkpointed state. The area cost can be significant because of the large amount of state information saved for each instruction.

FIGS. 1-4 depict embodiments of processor devices that accelerate the reversal of speculative state changes and recovery of resources by undoing speculative changes instruction-by-instruction in reverse program order and concurrently recovering resources associated with each instruction as it is being undone. For example, a finite state machine may be used to interrupt the dispatch of instructions when speculative instructions along an incorrectly predicted path are flushed from an instruction pipeline in a processing device. Changes to the speculative state made by the incorrect speculative instructions can then be undone (or rolled back) in reverse program order using stored information that indicates the change in the speculative state produced by each instruction. For example, the instructions A, B, and C may be dispatched speculatively and may change the state of the processing device from an initial state S0 to S1, then to S2, and then to S3. If the instructions were dispatched along an incorrectly predicted branch, the state of the processing device can be rolled back by undoing the changes in reverse program order. For example, the state of the machine can be rolled back from S3 to S2 by undoing the changes caused by the instruction C, then from S2 to S1 by undoing the changes caused by the instruction B, and then from S1 to S0 by undoing the changes caused by the instruction A.

Resources allocated to instructions along the incorrectly predicted path may be recovered concurrently with undoing the changes made to the speculative state by the instruction. For example, physical register entries associated with instruction C can be freed concurrently with reversing the state from S3 to S2, physical register entries associated with instruction B can be freed concurrently with reversing the state from S2 to S1, and physical register entries associated with instruction A can be freed concurrently with reversing the state from S1 to S0. Some embodiments of the finite state machine may also stop or otherwise interrupt the retirement of instructions, e.g., so that all of the ports of a retire queue can be used to reverse, in parallel, speculative state changes caused by multiple instructions. For example, the speculative state changes caused by four instructions can be read out in parallel using four read ports and this information can be used to reverse the speculative state changes. Alternatively, additional ports may be added to the retire queue to support concurrent reversal of the speculative state changes and retirement of instructions.

To facilitate undoing the speculative changes, entries in a retire queue may store a pointer to elements (such as physical register numbers or stack pointers) that were modified by the instruction held in the entry and information that indicates the previous value of the element. This information can include, for example, either the previous value of the element itself or a difference between the previous value and a modified value of the element, which then may be applied to the current value of the element to arrive at the previous value. The changes to the speculative state may therefore be undone by copying the previous value into the element indicated by the pointer or by modifying the previous value based on the difference indicated in the entry of the retire queue.

Recovering from a flush by unwinding the speculative state changes for each instruction along a bad path, instead of waiting for retire to catch up to the flush point and then copying the committed state to the speculative state, can help the processing device achieve better performance by avoiding the wait for retire to catch up. Moreover, the unwinding can be done without checkpoints by reading the retire queue backwards through the instructions in the bad path, thereby avoiding adding area to implement a checkpoint array.

FIG. 1 is a block diagram of a processor core 100, according to some embodiments. Processor core 100 may include circuitry for executing instructions according to a predefined instruction set. The processor core 100 may be implemented in a single-processor configuration or in a multi-processor configuration. Some embodiments of the processor core 100 may be included in a multi-core configuration within a processing node of a multi-node system. An instruction cache (I-cache) 102 may store instructions for a software application and a data cache (D-cache) 104 may store data used in computations performed by the instructions, in some instances, the I-cache 102 and the D-cache 104 may be implemented together as a unified cache or as part of a hierarchy of caches such as L1 and L2 cache structures.

The processor core 100 further includes an instruction fetch unit (IFU) 106 for fetching one or more instructions from the I-cache 102. The IFU 106 may include a program counter (PC) register that holds a pointer to an address of the next instructions to fetch from the i-cache 102. A branch prediction unit 108 may be coupled to the IFU 106 and the branch prediction unit 108 may be configured to predict results of instructions that change the flow of an instruction stream from executing a next sequential instruction, e.g., branch instructions. A branch instruction may be conditionally executed depending on how the flow of control may be altered at the branch point. For example, an IF(A)-THEN (B)-ELSE(C) statement is a branch instruction that directs the program flow down the path represented by branch B if the condition A is satisfied. Otherwise, this instruction directs the program flow down the path represented by branch C. The branch prediction unit 108 may therefore predict whether the condition A is satisfied before the instruction is executed to evaluate the condition A. Instructions down the path represented by branch B may be speculatively dispatched and executed if the branch prediction unit 108 predicts that the condition A is satisfied. Instructions down the path represented by branch C may be speculatively dispatched and executed if the branch prediction unit 108 predicts that the condition A is not satisfied.

A decoder unit 10 implemented in the processor core 100 decodes the opcodes of the fetched instructions. Some embodiments of the decoder unit 110 may divide a single instruction into two or more micro-operations (micro-ops). The micro-ops may be processed by subsequent pipeline stages and executed in program order or out-of-order. However, the micro-ops may not be committed until each micro-op corresponding to an original instruction is ready. As used herein, a reference to the processing of an "instruction" in core 100 may refer to the processing of the instruction as whole or refer to the processing of an individual micro-op comprised within the instruction. The decoder unit 110 may allocate entries in an in-order retire queue 112, which may also be referred to as a reorder buffer, in reservation stations, or in a load/store unit 114. In the example shown, a reservation station may comprise a rename unit 116 and a scheduler 118, which are shown as separate units. The flow of instructions from the decoder unit 110 to the allocation of entries in the rename unit 116 may be referred to as the dispatch of instructions. The rename unit 116 may be configured to perform register renaming for the fetched instructions.

Once decoded and renamed, instructions may be ready to be scheduled for execution. The scheduler 118 may act as an instruction queue where instructions are stored in entries and wait until their operands become available in the corresponding source registers. When operands are available and hardware resources are also available, an instruction may be issued from the scheduler 118 to the integer and floating-point functional units 120 or the load/store unit 114 for execution. Upon completion of an instruction, the scheduler 118 may signal completion and a fault status for the instruction to the retire queue 112.

The retire queue 112 may provide fault signals to the scheduler 118 to identify and clear speculative instructions along incorrectly predicted paths. Some embodiments of the scheduler 118 may therefore include compare logic to compare retire queue identifiers of incorrect speculative instructions to identifiers of entries in the scheduler 118 for clearing incorrect speculative instructions. Flush recovery updates may also be sent from the retire queue 112 to the rename unit 116, e.g., when the retire queue 112 frees one or more physical register file entries for use by the rename unit 116. In some embodiments, a rename bus between the retire queue 112 and the rename unit 116 may include four ports that can each write entries in the rename unit 116, e.g. to support flush recovery for four instructions in parallel. The architectural state map 126 may also be copied to the rename unit 116 for flush recovery when retirement of instructions in the retire queue 112 has caught up to the flush, as discussed herein.

The functional units 120 may include arithmetic logic units (ALUs) for computational calculations such as addition, subtraction, multiplication, division, and square root. Results from the functional units 120 or the load/store unit 114 may be presented on a common data bus 122. The results may be sent to the retire queue 112 where the instruction receives its results and may be marked for retirement. Instructions at the head-of-the-queue may have their results written to the appropriate physical registers in a physical register file 124.

The processor core 100 may also include an architectural state map 126 that maps the logical or architectural register numbers to the associated physical register numbers that indicate the physical registers in the physical register file 124. The state of the processor core 100 may be indicated by values stored in general-purpose registers. For example, the state of the processor core 100 may be represented by the architectural state map 126 and the contents of the physical register file 124. Some embodiments of the architectural state map 126 include representations of the committed state of the processor core 100 and the speculative state of the processor core 100, e.g., they may include general purpose registers that store values that represent the committed or speculative states of the processor core 100. Instructions in the retire queue 112 may be retired in-order and a head-of-queue pointer may be adjusted to the subsequent instruction in program order as each instruction is retired.

Logic may be included in the functional units 120 to determine an outcome of a branch instruction and to compare the calculated outcome with the value predicted by the branch prediction unit 108. If a predicted outcome and an actual outcome do not match, a misprediction occurred, and the speculative instructions after the branch instruction may be flushed from the instruction pipeline and a new fetch with the correct PC value may be performed. For example, if the branch prediction unit 108 predicts that the condition A will be satisfied in the IF(A)-THEN(B)-ELSE(C) statement, but the functional units 120 determine that condition A is not actually satisfied when executed, instructions down branch B that have been speculatively dispatched or executed may be rolled back by reversing the speculative state changes back to the branch instruction and concurrently recovering any resources allocated to instructions down branch B. Instructions down branch C may then be dispatched and executed.

Figure 2:
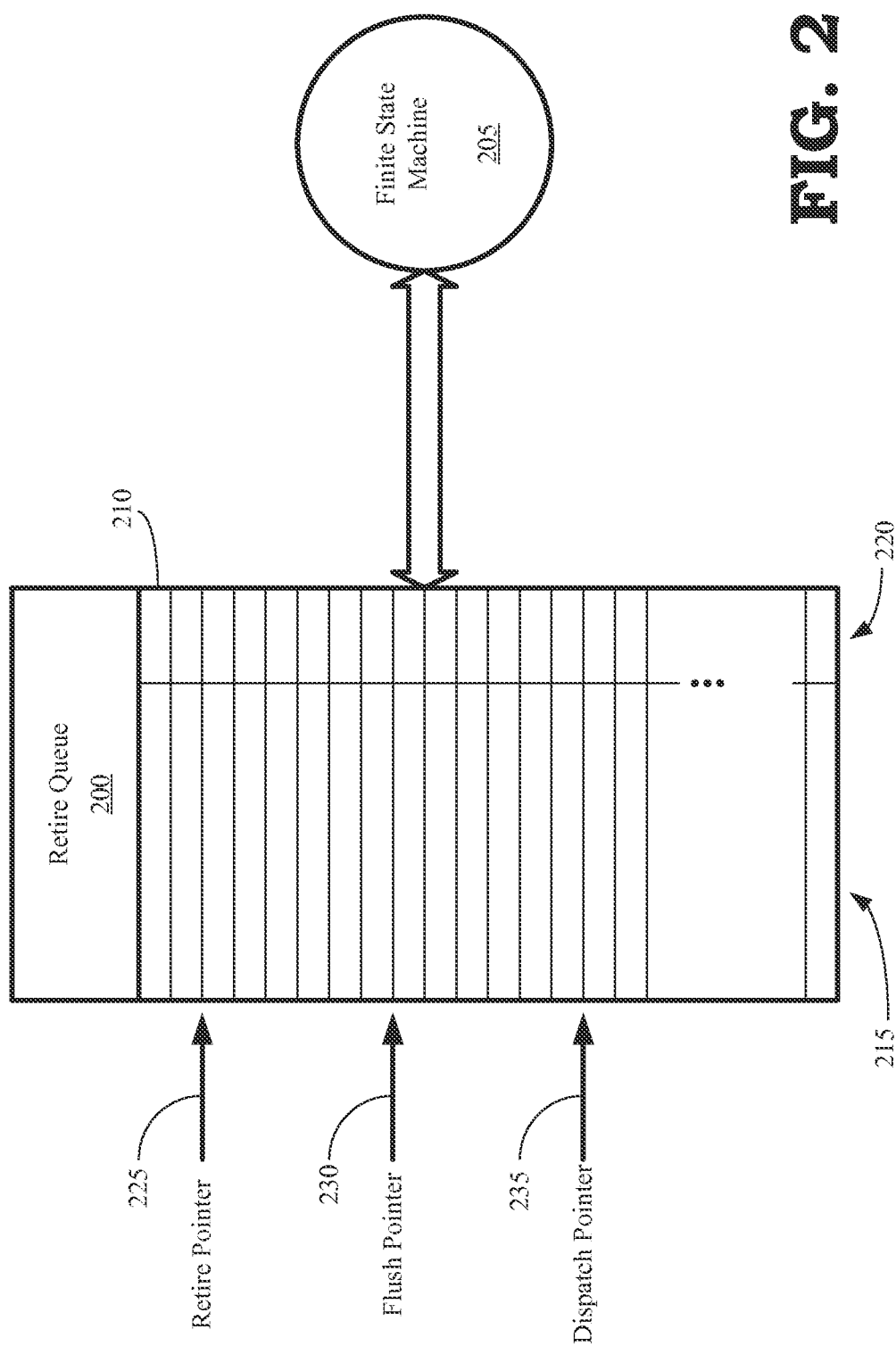
FIG. 2 is a block diagram of a retire queue and a finite state machine that may be used to control flush of a retire queue of a processor core, according to some embodiments.

FIG. 2 is a block diagram of a retire queue 200 and a finite state machine 205 that may be used to control flushing of the retire queue 200, according to some embodiments. The retire queue 200 includes a plurality of entries 210 (in the interest of clarity only one indicated by a reference numeral in FIG. 2) for storing information identifying the instructions and the results of executing the instructions. For example, each entry in the retire queue 200 includes one or more columns 215 for storing the instruction and result information. Some embodiments of the retire queue 200 support out-of-order execution by holding each entry 210 until the results for all older instructions have been written back to a register file such as the physical register file 124 shown in FIG. 1. Once the results of the older instructions have been written back to the register file, the results of a younger instruction can be written back to the register file. Writing the result of an instruction back to the register file is typically referred to as retiring the instruction.

The state of the instructions in entries 210 of the retire queue 200 can be indicated using a set of pointers. Some embodiments of the retire queue 200 include a retire pointer 225 that indicates the most recently retired instruction. The entries in the retire queue 200 shown in FIG. 2 are listed in program order and the age of the instructions decreases from older to younger from the top to the bottom of the retire queue 200. The instructions above the retire pointer 225 have therefore also been retired. The flush pointer 230 is set to indicate the youngest un-retired instruction that is known to be along a correctly predicted path. Thus, instructions between the retire pointer 225 and a flush pointer 230 were dispatched speculatively and were subsequently determined to be along a correctly predicted path. These instructions are therefore awaiting retirement. A dispatch pointer 235 points to the most recently dispatched instruction. Instructions between the flush pointer 230 and the dispatch pointer 235 may have been issued speculatively but it is not yet known whether they are along a correctly predicted path. These instructions may be flushed if they turn out to be part of an incorrectly predicted path, e.g., in the event of a branch misprediction.

The retire queue 200 also includes one or more columns 220 for storing information that can be used to identify changes in a state of the processing device caused by the instructions in the retire queue 200. For example, instructions between the flush pointer 225 and the dispatch pointer 235 may (correctly or incorrectly) change the speculative state of the processing device. Some embodiments of the entries 210 may store a pointer to elements that were modified by the instruction held in the entry 210 and information that indicates the previous value of the element, e.g. the previous value of the element or a difference between the previous value and a modified value of the element. The columns 220 may also include information that can be used to identify resources allocated to the instructions such as entries in the physical register file 124 shown in FIG. 1.

The finite state machine 205 may be used to flush incorrect speculative instructions from the pipeline. Some embodiments of the finite state machine 205 may be used to accelerate the reversal of speculative state changes and recovery of resources by undoing speculative changes instruction-by-instruction in reverse program order. The phrase "reverse program order" indicates that the speculative state changes and resource recovery are performed in an order that is opposite to the program order of the instructions, e.g., for the youngest instruction, then the next youngest instruction, etc. For example, the finite state machine 205 may interrupt the dispatch of instructions when speculative instructions between the pointer 230 and the pointer 235 are found to be along an incorrectly predicted path and are consequently flushed from the instruction pipeline. Changes to the speculative state made by the incorrect speculative instructions can then be undone in reverse program order. For example, changes to the state caused by the oldest speculative instruction along the bad path (i.e., the instruction in the entry pointed to by the pointer 235) may be reversed or otherwise undone using the information stored in the column 220. Resources allocated to the oldest speculative instruction may also be deallocated concurrently with reversing the state changes. Changes to the state caused by the next oldest speculative instruction may then be reversed and its allocated resources may be concurrently deallocated. This process is iterated until the changes caused by all of the instructions in the entries 210 between the pointer 230 and the pointer 235 have been undone and their resources deallocated. Example techniques for undoing the state change and for deallocating the resources allocated to a speculative instruction are described in detail below Some embodiments of the finite state machine 205 may also interrupt retirement of instructions while the changes are being rolled back and the resources deallocated, e.g., so that multiple ports of the retire queue 200 can be used to reverse, in parallel, speculative state changes caused by multiple instructions such as the instructions in the entries 210 between the pointers 225, 230. Alternatively, additional ports of the retire queue 200 may be used to support concurrent reversal of the speculative state changes and retirement of instructions. For example, if the retire queue 200 includes eight ports for accessing the entries 210, four of the ports may be used to reverse speculative state changes caused by instructions between the pointers 230, 235 in parallel and four of the ports may be used to concurrently retire instructions between the pointers 225, 230.

Figure 3:
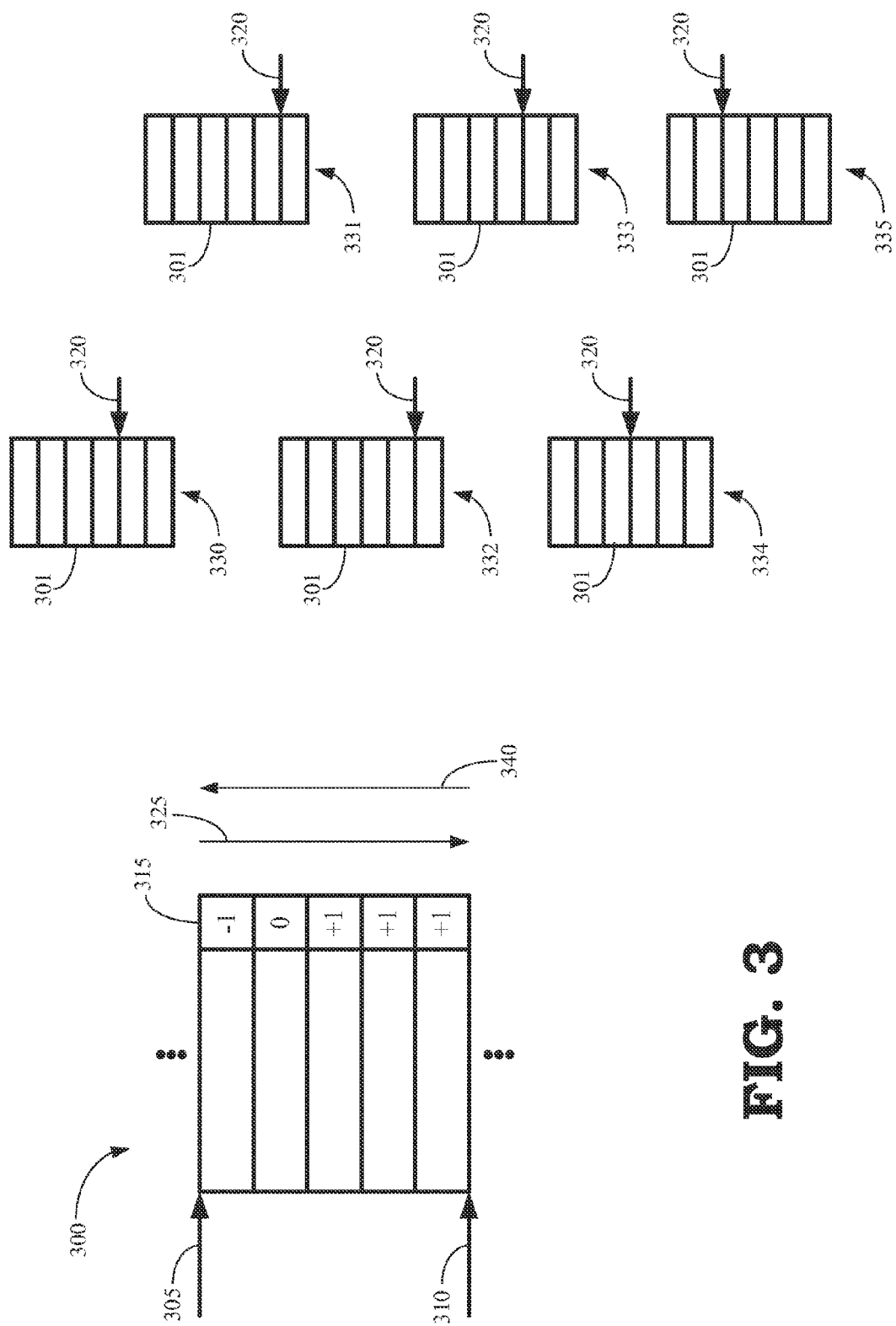
FIG. 3 is a block diagram that illustrates the reversal of changes to a stack of a processor core caused by speculative instructions along an incorrectly predicted path, according to some embodiments.

FIG. 3 is a block diagram that illustrates the reversal (that is, undoing) of changes to a stack 301 caused by speculative instructions along an incorrectly predicted path, according to some embodiments. A portion of a retire queue 300 includes entries for speculative instructions between a flush pointer 305 and a dispatch pointer 310. Each entry includes a field 315 for storing information indicating a change in a location in the stack 301 pointed to by a stack pointer 320. Each change is caused by the execution of the instruction in the corresponding entry. The entries are stored in the retire queue 300 in program order so that the age of the entries decreases from older to younger from top to bottom, as indicated by the arrow 325. The state 330 of the stack 301 corresponds to the state generated by instructions that are older than the flush pointer 305. In the event of a flush, the stack 301 should return to the state 330.

The first instruction following the flush pointer 305 shifts the pointer down one entry (−1) in the stack to produce the state 331. The next instruction does not move the pointer (0) and so the state 332 has the pointer in the same location as the state 331. The next three instructions each shift the pointer up one entry (+1) to produce the states 333, 334, and 335. The state 335 corresponds to the state of the stack following the youngest dispatched instruction indicated by the dispatch pointer 310.

In the event that the instructions between the pointer 305 and the pointer 310 are flushed, the state of the stack can be recovered by reversing the changes produced by the instructions one-by-one in reverse program order, as indicated by the arrow representing the reverse program order 340. For example, the change produced by the youngest instruction can be reversed by using stored state information to determine that the youngest instruction shifted the pointer up one entry (+1) so the state can be returned to its state prior to the youngest instruction by shifting the pointer down one entry (−1) in the stack to change the state from the state 335 to the state 334. Resources allocated to the youngest instruction may also be concurrently deallocated. The next youngest instruction can be reversed by shifting the pointer down one entry (−1) in the stack to change the state from the state 334 to the state 333 and resources allocated to the next youngest instruction may be concurrently deallocated. This process can be repeated in reverse program order 340 until the changes caused by each of the instructions between the pointers 305, 310 have been reversed to return the state of the stack to the state 330 and the resources allocated to these instructions have been deallocated.

Figure 4:
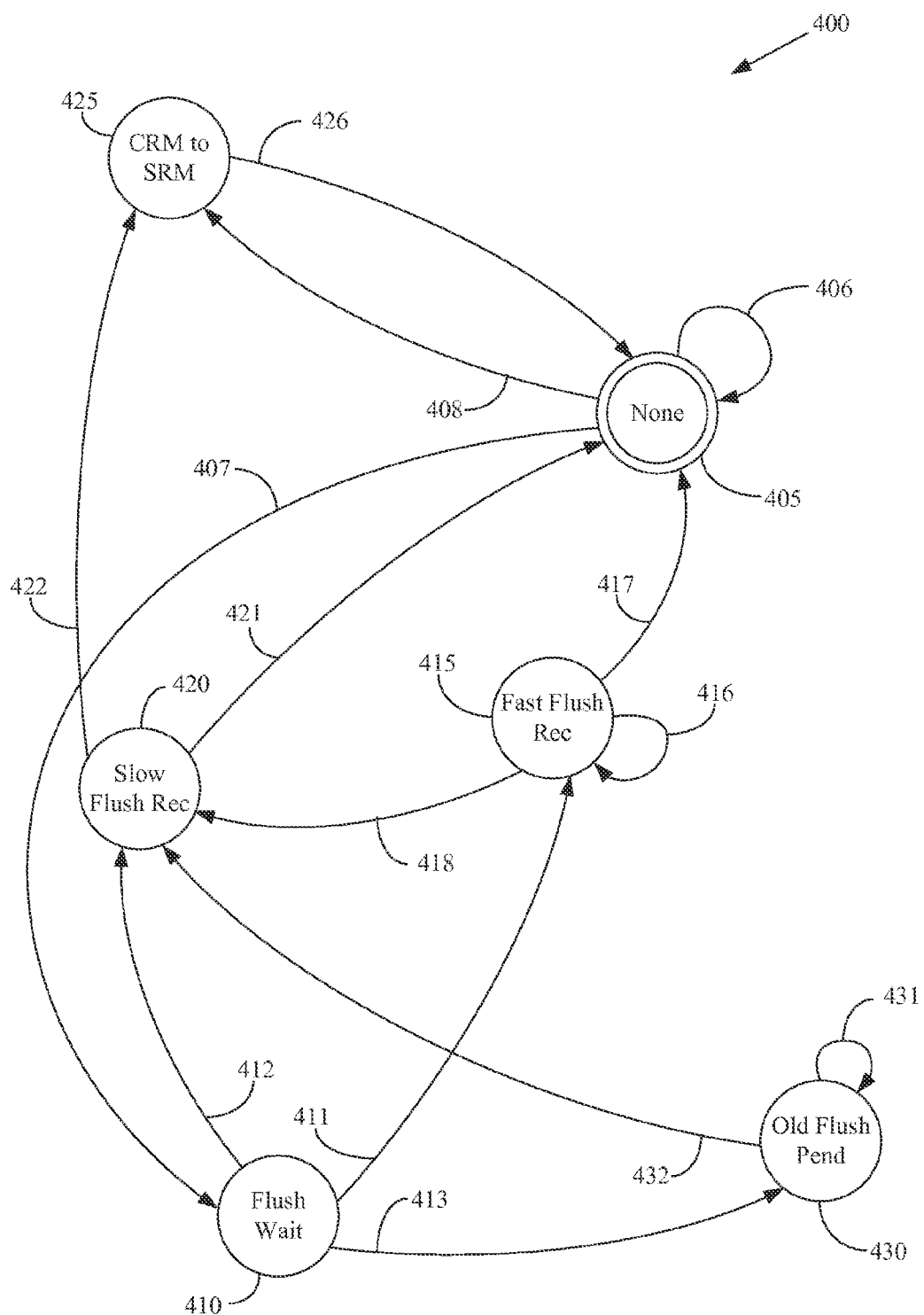
FIG. 4 is a diagram of a finite state machine that may be used to implement the finite state machine shown in FIG. 2, according to some embodiments.

FIG. 4 is a diagram of a finite state machine 400 that may be used to implement the finite state machine 205 shown in FIG. 2, according to some embodiments. As long as instructions have not been flushed, e.g. due to branch mispredictions, exceptions, or traps, the finite state machine 400 remains in the state 405 and does not perform any recovery actions, as indicated by the arrow 406. The finite state machine 400 transitions from the state 405 to the waiting state 410 in response to a flush of pipeline instructions, as indicated by the arrow 407. Some embodiments of the waiting state 410 may cause the finite state machine 400 to wait a predetermined number of cycles so that in-flight instructions can write to the retire queue before the recovery process begins. Once the waiting period is over, e.g., when a cycle counter has counted down to 0, the finite state machine 400 transitions to the fast flush recovery state 415, as indicated by the arrow 411.

The finite state machine 400 can initiate the concurrent reversal of state changes and recovery of resources as discussed herein with regard to FIGS. 2-3 when the finite state machine 400 is in the fast flush recovery state 415. For example, the finite state machine 400 may undo state changes caused by incorrectly speculated instructions in the retire queue instruction-by instruction in reverse program order, while concurrently deallocating the resources associated with the instructions, as indicated by the arrow 416. Once the recovery is complete for the incorrectly speculated instructions, the finite state machine 400 transitions back to the state 405, as indicated by the arrow 417. In some cases, the fast flush recovery may not be able to complete and the finite state machine 400 may transition to a slow flush recovery state 420, as indicated by the arrow 418. The finite state machine 400 may also transition from the flush wait state 410 to the slow flush recovery state 420, as indicated by the arrow 412. For example, the finite state machine 400 may transition to the fast flush recovery state 415 on branch mispredictions but may transition to the slow flush recovery state 420 to handle exceptions or traps.

In the slow flush recovery state 420, the finite state machine 400 may stop the dispatch of new instructions, wait for retirement of instructions up to the flush pointer, and then copy the committed state to the speculative state. The resources allocated to the flushed instructions may then be recovered by deallocating the resources and the finite state machine 400 may transition to the state 405, as indicated by the arrow 421. In some cases, the finite state machine 400 may transition (as indicated by the arrow 422) from the slow flush recovery state 420 to a register copy state (CRM to SRM) 425 to copy the committed register map (CRM) to the speculative register map (SRM). Some embodiments of the finite state machine 400 may also transition directly from the state 405 to the register copy state 425 in response to some instructions, as indicated by the arrow 408. The finite state machine 400 may then transition from the register copy state 425 to the state 405 when the copy process is complete, as indicated by the arrow 426.

Some embodiments of processing devices described herein may support a re-synchronization instruction that forces the retire queue to wait until retirement of instructions up to the flush pointer. Thus, some embodiments of the finite state machine 400 include an old flush pending state 430 and the finite state machine 400 may transition to the old flush pending state 430 in response to the re-synchronization instruction, as indicated by the arrow 413. The finite state machine 400 waits in the old flush pending state 430 until retirement catches up to the flush pointer (as indicated by the arrow 431) and may then transition to the flow flush recovery state 420, as indicated by the arrow 432.

In some embodiments, the apparatus and techniques described above are implemented in a system comprising one or more integrated circuit (IC) devices (also referred to as integrated circuit packages or microchips), such as the processor cores described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
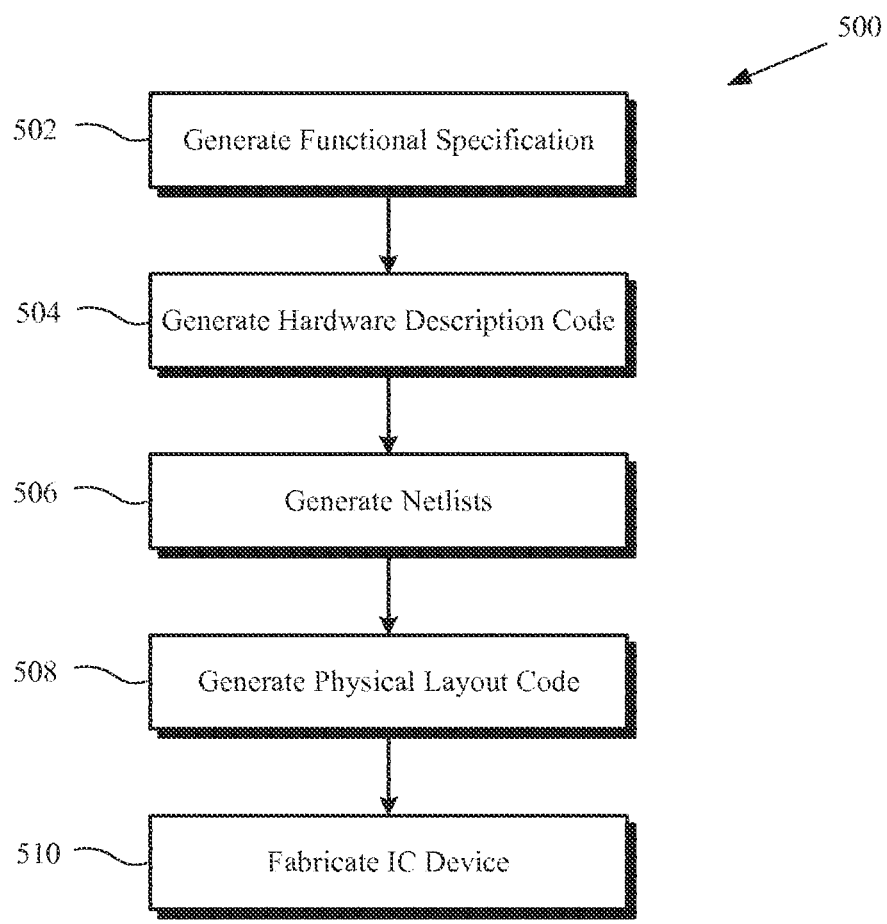
FIG. 5 is a flow diagram illustrating a method for the design and fabrication of an IC device implementing one or more aspects, according to some embodiments.

FIG. 5 is a flow diagram illustrating an example method 500 for the design and fabrication of an IC device implementing one or more aspects, according to some embodiments. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. Some embodiments of the hardware description code are represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, System Verilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable medium) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code assembly language code, object code or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for flushing speculative instructions previously dispatched for execution in a processing device, comprising:
   undoing changes in a state of the processing device caused by the speculative instructions, the undoing performed instruction-by-instruction in reverse program order beginning with a youngest speculative instruction along an incorrectly predicted instruction path; and
   concurrently deallocating resources previously allocated to the speculative instructions.

2. The method of claim 1, further comprising:
   initiating a flush of the speculative instructions in response to a branch misprediction of a first plurality of speculative instructions along the incorrectly predicted instruction path.

3. The method of claim 2, further comprising:
   interrupting retirement of instructions in response to the flush of the speculative instructions.

4. The method of claim 2, further comprising:
   retiring a second plurality of speculative instructions concurrently with undoing the changes in the state of the processing device caused by the first plurality of speculative instructions, wherein the second plurality of speculative instructions are on a correctly predicted instruction path and are earlier in program order than the first plurality of speculative instructions.

5. The method of claim 1, further comprising:
   storing, in retire queue entries associated with the speculative instructions, information indicating the changes in the state of the processing device caused by the speculative instructions.

6. The method of claim 5, wherein storing the information indicating the changes in the state of the processing device comprises storing pointers to state information changed by the speculative instructions and storing at least one of a prior value of the state information or a difference between a current value and a prior value of the state information.

7. The method of claim 5, wherein undoing the changes in the state of the processing device comprises returning the state of the processing device to a prior state using the information indicating the changes in the state of the processing device caused by the speculative instructions.

8. The method of claim 1, wherein undoing the changes in the state and concurrently deallocating the resources comprises undoing in parallel a plurality of changes in the state of the processing device and concurrently deallocating resources previously allocated to a corresponding plurality of the speculative instructions.

9. The method of claim 1, further comprising:
   resuming dispatch of instructions in response to completion of the undoing of the changes in the state of the processing device and completion of the deallocation of the resources previously allocated to the speculative instructions back to a flush pointer that indicates the youngest un-retired instruction along a correctly predicted instruction path.

10. A processing device, comprising:
    a retire queue to store entries for instructions that are awaiting retirement; and
    a finite state machine to interrupt dispatch of instructions in response to a flush of speculative instructions previously dispatched for execution in the processing device and to undo, instruction-by-instruction in reverse program order beginning with a youngest speculative instruction along an incorrectly predicted instruction path, changes in a state of the processing device caused by the speculative instructions while concurrently deallocating resources previously allocated to the speculative instructions.

11. The processing device of claim 10, wherein the finite state machine is to initiate the flush of the speculative instructions in response to a branch misprediction of a first plurality of speculative instructions along the incorrectly predicted instruction path.

12. The processing device of claim 11, wherein the finite state machine is to interrupt retirement of instructions in response to the flush of the speculative instructions.

13. The processing device of claim 11, wherein the retire queue is to retire a second plurality of speculative instructions concurrently with undoing the changes in the state of the processing device caused by the first plurality of speculative instructions, wherein the second plurality of speculative instructions are on a correctly predicted instruction path and are earlier in program order than the first plurality of speculative instructions.

14. The processing device of claim 10, wherein the retire queue is to store, in entries associated with the speculative instructions, information indicating the changes in the state of the processing device caused by the speculative instructions.

15. The processing device of claim 14, wherein the retire queue is to store pointers to state information changed by the speculative instructions and is to store at least one of a prior value of the state information or a difference between a current and the prior value of the state information.

16. The processing device of claim 14, wherein the state of the processing device is to return to a prior state using the information indicating the changes in the state of the processing device caused by the speculative instructions.

17. The processing device of claim 14, wherein the processing device is to undo, in parallel, a plurality of changes in the state of the processing device and concurrently deallocate resources previously allocated to a corresponding plurality of the speculative instructions.

18. The processing device of claim 10, wherein the processing device is to resume dispatch of instructions in response to undoing the changes in the state of the processing device and deallocate the resources previously allocated to the speculative instructions back to a flush pointer that indicates the youngest un-retired instruction along a correctly predicted instruction path.

19. A non-transitory computer readable medium embodying a set of executable instructions, the set of executable instructions to manipulate a computer system to perform a portion of a process to fabricate at least part of a semiconductor device, the semiconductor device comprising:
   a retire queue to store entries for instructions that are awaiting retirement; and
   a finite state machine to interrupt dispatch of instructions in response to a flush of speculative instructions previously dispatched for execution in the semiconductor device and undo, instruction-by-instruction in reverse program order beginning with a youngest speculative instruction along an incorrectly predicted instruction path, changes in a state of the semiconductor device caused by the speculative instructions while concurrently deallocating resources previously allocated to the speculative instructions.

20. The non-transitory computer readable medium set forth in claim 19, wherein the retire queue stores, in entries associated with the speculative instructions, pointers to state information changed by the speculative instructions and at least one of a prior value of the state information or a difference between a current and the prior value of the state information.

* * * * *